United States Patent
Garcia-Martin et al.

(10) Patent No.: US 8,204,932 B2
(45) Date of Patent: *Jun. 19, 2012

(54) METHOD AND APPARATUS FOR INSTANT MESSAGING

(75) Inventors: Miguel-Angel Garcia-Martin, Helsinki (FI); Adamu Haruna, Tampere (FI)

(73) Assignee: Nokia Corporation, Espoo (FI)

( * ) Notice: Subject to any disclaimer, the term of this patent is extended or adjusted under 35 U.S.C. 154(b) by 93 days.

This patent is subject to a terminal disclaimer.

(21) Appl. No.: 12/480,088

(22) Filed: Jun. 8, 2009

(65) Prior Publication Data
US 2009/0282118 A1  Nov. 12, 2009

Related U.S. Application Data

(63) Continuation of application No. 11/319,268, filed on Dec. 29, 2005, now Pat. No. 7,561,595.

(60) Provisional application No. 60/722,054, filed on Sep. 30, 2005.

(51) Int. Cl.
*H04L 29/06* (2006.01)

(52) U.S. Cl. ........ 709/203; 709/220; 709/228; 370/465; 370/469

(58) Field of Classification Search ........ 709/206, 709/220, 228; 370/465, 335; 455/449, 416
See application file for complete search history.

(56) References Cited

U.S. PATENT DOCUMENTS

| | | | |
|---|---|---|---|
| 7,058,036 B1* | 6/2006 | Yu et al. | 370/335 |
| 7,532,890 B2* | 5/2009 | Davies et al. | 455/449 |
| 7,561,595 B2* | 7/2009 | Garcia-Martin et al. | 370/465 |
| 7,672,255 B2* | 3/2010 | Lin | 370/260 |
| 2005/0213537 A1 | 9/2005 | Ingimundarson et al. | |
| 2005/0233737 A1* | 10/2005 | Lin | 455/416 |
| 2006/0083305 A1* | 4/2006 | Dougherty et al. | 375/240.12 |
| 2007/0076751 A1* | 4/2007 | Garcia-Martin et al. | 370/466 |
| 2007/0078935 A1* | 4/2007 | Garcia-Martin et al. | 709/206 |
| 2008/0147806 A1* | 6/2008 | Robbie et al. | 709/206 |
| 2010/0125744 A1* | 5/2010 | Hong | 713/323 |

FOREIGN PATENT DOCUMENTS

| | | |
|---|---|---|
| CN | 642148 A | 7/2005 |
| EP | 1 675 352 A1 | 6/2006 |
| JP | 2004-312579 A | 11/2004 |
| JP | 2005-33702 A | 2/2005 |
| JP | 2005-198181 A | 7/2005 |

(Continued)

OTHER PUBLICATIONS

Campbell et al.., "The Message Session Relay Protocol, draft-ietf-simple-message-sessions-09.txt", Oct. 24, 2004, retrieved from the internet, pp. 1-47. URL:<http://www.softarmor.com/wgdb/docs/draft-ietf-simple-message-sessions-09.txt>.

(Continued)

*Primary Examiner* — Khanh Dinh
(74) *Attorney, Agent, or Firm* — Ditthavong Mori & Steiner, P.C.

(57) ABSTRACT

A method and apparatus for stored message delivery are taught. The method and apparatus can be configured to accomplish the steps of receiving a Session Initiation Protocol (SIP) message, as a received SIP message, encapsulating the received SIP message in a Message Session Relay Protocol (MSRP) message, as an encapsulated SIP message; and transmitting the encapsulated SIP message to an intended recipient.

16 Claims, 4 Drawing Sheets

FOREIGN PATENT DOCUMENTS

| | | |
|---|---|---|
| WO | WO 2005/029809 A | 3/2005 |
| WO | WO 2005/029809 A1 | 3/2005 |

OTHER PUBLICATIONS

International Preliminary Report on Patentability, Chapter I (IPRP1) of corresponding International Application No. PCT/IB2006/002587 dated Apr. 1, 2008. pp. 1.

International Search Report and Written Opinion of corresponding International Application No. PCT/IB2006/002587 dated Apr. 11, 2007, pp. 1-13.

Office Action of corresponding Australian patent Application No. 2006296335 dated Feb. 17, 2010, Australia, pp. 1-2.

Singh et al., "Peer-to-Peer Internet Telephony using SIP", Department of Computer Science, Columbia University, 2004, pp. 1-19.

Japanese Office action for corresponding JP application No. 2008-532893 dated Nov. 16, 2010, pp. 1-12.

The message Session Relay Protocol, Campbell et al., draft-ietf-simple-message-sessions-11.txt, Jul. 2005, IETF, http://tools.ietf.org/html/draft-ietf-simple-message-sessions-11, pp. 37-39.

Chinese office action for corresponding CN application No. 200680040515.8 dated Nov. 8, 2010, pp. 1-8.

Extended European search report for corresponding EP application No. 06795523.7-2411 dated Jan. 19, 2011, pp. 1-7.

B. Campbell, et al., "The Message Session Relay Protocol draft-ietf-simple-message-session-09.txt" dated Oct. 24, 2004, pp. 1-7.

Chinese Office Action for corresponding CN application No. 200680040515.8 dated Aug. 12, 2011, pp. 1-6.

Draft Response to Chinese Office Action dated Aug. 12, 2011 for Corresponding CN application No. 200680040515.8.

Japanese Office Action for JP Application No. 2008-532893 dated Nov. 1, 2011, pp. 1-5.

* cited by examiner

METHOD AND APPARATUS FOR INSTANT MESSAGING

CROSS REFERENCE TO RELATED APPLICATION

The present application is a continuation of U.S. patent application Ser. No. 11/319,268, filed on Dec. 29, 2005, which claims priority of U.S. Patent Application Ser. No. 60/722,054, filed on Sep. 30, 2005; the contents of each are hereby incorporated by reference.

BACKGROUND OF THE INVENTION

1. Field of the Invention

This invention is related to instant messaging using protocols such as SIP (Session Initiation Protocol) and MSRP (Message Session Relay Protocol), and more particularly to the storage of SIP and MSRP messages as encapsulated MSRP messages.

2. Description of the Related Art

SIP instant messages can be sent to users, whether or not the user is online. A SIP MESSAGE request can be used to carry the instant message. This is sometimes called page mode, because each instant message is not related to other instant messages. When it is desirable to establish a session of instant messages, SIP can be used to establish a session and MSRP is used to carry the actual instant messages within that session. This can be useful for users who are trying to follow the flow of a conversation, because the relation between instant messages can identify them as corresponding to a given conversation.

When a user A sends a SIP instant message to user B, and B is offline, the message is conventionally stored in an application server. Previously there was not a mechanism whereby the user could retrieve the user's stored messages without missing important bits of information (sender, date/time, session, and the like). In earlier solutions if the sender used SIP to send messages to a user who is offline, the actual contents of the instant messages were stored in a store message application server. Subsequently, when the recipient was online and used MSRP to retrieve the stored messages, the recipient got the actual instant messages but did not get the identity (for example, SIP URI) of the sender, nor the date/time information when the message was sent.

Additionally it was not possible for the recipient to distinguish between messages belonging to a SIP session of instant messages and those messages deposited in the store message application server by using SIP MESSAGE requests. This occurred because the identity (e.g., SIP URI) of the person who deposited the message in the store message application server was only present in the SIP requests. When the text of the message was stored, the header information was not retained. Moreover, the MSRP headers do not contain any relation to or indication of those SIP headers.

Various conventional systems exist for retrieving deferred messages. For example, a time stamp can be added to the stored messages by an instant messaging service. SIP or MSRP can be used to retrieve the stored messages. It has been proposed that if messages contained metadata, the user could better manage deferred instant messages. However, no realistic solutions have been provided.

SUMMARY OF THE INVENTION

An embodiment of the present invention provides, for example, a method for stored message delivery including receiving a SIP or MSRP message, encapsulating the received SIP or MSRP message in another MSRP message, and transmitting the encapsulated SIP or MSRP messages to an intended recipient.

Another embodiment of the present invention provides, for example, an apparatus for use as a store message application server. The apparatus can include a reception module configured to receive a SIP message, an encapsulation module configured to encapsulate the received SIP message in an MSRP message, and a transmission module configured to transmit the encapsulated SIP message to an intended recipient.

Yet another embodiment of the present invention provides, for example, an apparatus for use as a store message application server including means for receiving a SIP message. The apparatus can also include means for encapsulating the received SIP message in an MSRP message and means for transmitting the encapsulated SIP message to an intended recipient.

An additional embodiment of the present invention provides, for example, a computer program embodied on a computer readable medium for providing stored messages, comprising a computer program controlling a computer to receive a SIP message, encapsulate the received SIP message in an MSRP message, and transmit the encapsulated SIP message to an intended recipient.

BRIEF DESCRIPTION OF THE DRAWINGS

For proper understanding of the invention, reference should be made to the accompanying drawings

DESCRIPTION OF THE PREFERRED EMBODIMENT(S)

Figure 1:
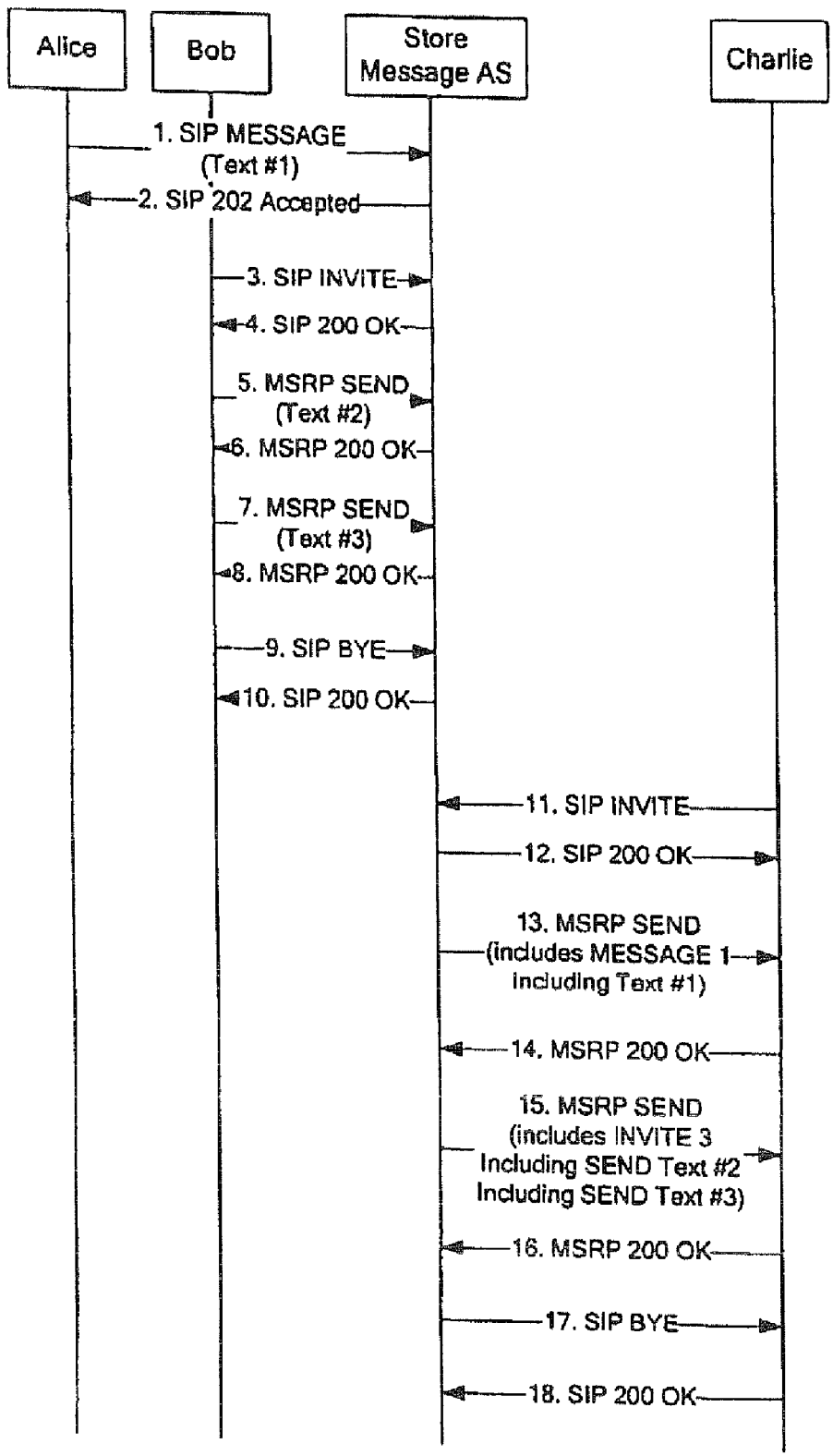
FIG. 1 shows a diagram flow that exemplifies the sequence of messages.

Certain embodiments of the present invention can provide a SIP mechanism to retrieve instant messages that were previously deposited in an application server, which was acting as a message store application server. The invention can help to achieve these and other goals by maintaining the relevant headers of the SIP message by encapsulating it as a message/sip, for example, as defined in RFC 3261 Section 27.5, or as a message/sipfrag, as defined in RFC 3420, and then sending it as the payload of an MSRP SEND request. Additionally, a message store application server can then add a header to the MSRP SEND message and to the encapsulated SIP message containing the time and date when the message was received.

More particularly, the invention may be configured to insert a date/time header in every stored SIP and MSRP message. The invention can use novel semantics for the encapsulation of the stored instant messages, and the message/sip and message/sipfrag may be used in MSRP, outside of its original context. The invention can provide a novel and unobvious method of delivering encapsulated SIP messages, including the header information, as the payload of an MSRP message. The invention can also provide novel semantics for encapsulating MSRP messages as message/msrp.

The invention, therefore, can relate to an area of instant messaging based upon SIP/SIMPLE technology. SIP/

SIMPLE develops services, mainly instant messaging and presence, based on the application of SIP and specifications developed within the IETF IMPP working group. SIP/SIMPLE IM in Open Mobile Alliance (OMA), which is mainly driven by operator service and business requirements, is also based on SIP/SIMPLE technology.

The invention can also provide a method and apparatus whereby a user can contact his mail server and retrieve existing instant messages already deposited in the store message application server. The instant messages can be deposited in the store message application server using SIP MESSAGE requests (as per IETF RFC 3428) or MSRP messages (e.g., MSRP SEND requests) that are part of a SIP session. The metadata and/or header information can enable the user to determine the source of the message, the time at which message was left, and so forth.

When a phone switches on, the phone can send a subscription to a message-summary event package, and receive a notification with the pending message; according to RFC 3842 "A Message Summary and Message Waiting Indication Event Package for the Session Initiation Protocol (SIP)." This mechanism can also be applied to voice mail, fax and the like. The Notifier (which may be an SIP User Agent acting on behalf of the user's messaging system) can send a message summary of the stored messages in the body of a SIP NOTIFY request, e.g. "there are 4 old messages and 3 new messages waiting for you."

After the summary counts, message headers such as To, From, Date, Subject, and Message-ID (In SIP this may map to Call-ID) may be appended to each message.

According to certain embodiments of the invention, once the User Equipment (UE) is notified, it can send an INVITE request to the message store application server including the type of desired media to retrieve (for the purpose of this invention, the INVITE request includes a Session Description Protocol (SDP) description of messaging with MSRP, but may also include other media types different than messaging).

Once a SIP session is established with the MSRP media, all stored messages may be transferred from the server to the UE. Each stored message may be sent in a separate MSRP SEND request (which may occur before chunking of MSRP SEND requests takes place), and each one may be identified by its own original Message-ID. In this way the user can retrieve all the messages at one time, but still may be able to classify all the messages by Message-ID.

In some solutions the original sender identification (user information) is necessarily lost because the MSRP headers do not contain any relation to the SIP URI that deposits the message. Therefore, the association of senders to their particular messages already available in messaging application inboxes such as e-mail, instant messaging, Multimedia Messaging Service (MMS), and the like, can be lost. This also applies to SIP MESSAGE requests, in that they can be sent but the recipient will not be able to identify the sender, because the messages are sent to the store message application server.

In some embodiments, the invention provides a mechanism whereby the user, when he wants to retrieve his stored instant messages, establishes an MSRP session with his store message application server. The store message Application Server (AS) may encapsulate each received session or standalone MESSAGE in an MSRP SEND request. Thus, each MSRP SEND request may represent a SIP session or MESSAGE that contains a payload (e.g. one or more MSRP SEND requests, or some other type in the case of message).

The invention is further described with the help of FIG. 1. According to this figure, Alice can send an Instant Message to Charlie using a SIP MESSAGE request 1. This MESSAGE request can contain some text, named here Text #1. Assuming that Charlie is offline, the message may be received and stored at the store message AS. The store message AS may acknowledge the SIP MESSAGE request 1 with a SIP 202 (Accepted) response 2.

Another user, Bob, can create a SIP session by sending an INVITE request 3 to Charlie. The INVITE request can contain a session description that includes an MSRP descriptor for the purpose of sending session-based instant messages. Since Charlie is offline, the store message AS can intercept the INVITE request and establish the session. The store message AS can acknowledge the SIP INVITE request 3 with a SIP 200 (OK) response 4. Then Charlie can deposit two messages in Charlie's messaging account, using MSRP SEND requests 5, 7, including Text #2 and Text #3, respectively, which can be acknowledged by MSRP 200 (OK) responses 6 and 8 respectively. Bob may conclude his session with a SIP BYE request 9 that may be acknowledged by a SIP 200 (OK) response 10.

At a later stage, Charlie comes online, and then may be notified that there are some messages in his inbox (RFC 3842 may provide some examples ways of notifying Charlie). Charlie may decide to retrieve his pending instant messages. Charlie then may establish a SIP session to his store message AS (SIP INVITE request 11). The store message AS may acknowledge with a SIP 200 (OK) response 12. The reverse is also possible: the store message AS may contact Charlie when it discerns that he is online.

Then the store message AS may take the stored MESSAGE that was sent as SIP MESSAGE request 1, keep the relevant header fields of the SIP MESSAGE request 1 (e.g., From, To, Call-ID, P-Asserted-Identity, etc.), encapsulate it as either a message/sip (Section 27.5 of RFC 3261) or message/sipfrag (RFC 3420), and send it as the payload of a MSRP SEND request 13. Charlie may acknowledge by sending an MSRP 200 (OK) response 14 to the store message AS. The session may be concluded by the store message AS sending a SIP BYE request 17 to Charlie, and Charlie responding with a SIP 200 (OK) response 18 to the store message AS. Other encapsulation techniques are also possible and permitted. The message may be encapsulated before or after being stored.

Similarly, the store message AS may take the stored SIP INVITE request 3, the stored MSRP SEND requests 5, 7, and the store SIP BYE request 9, and encapsulates them in another MSRP SEND request 15. The message type for the encapsulating MSRP SEND 15 may be set to message/sip or message/sipfrag.

On sending data to Charlie, the store message AS may add a header that contains the time and date the message was received, for every SIP and MSRP encapsulated message. The Call-ID (in SIP) and Message-ID in MSRP may be kept intact, thereby providing correlation with notifications.

Figure 2:
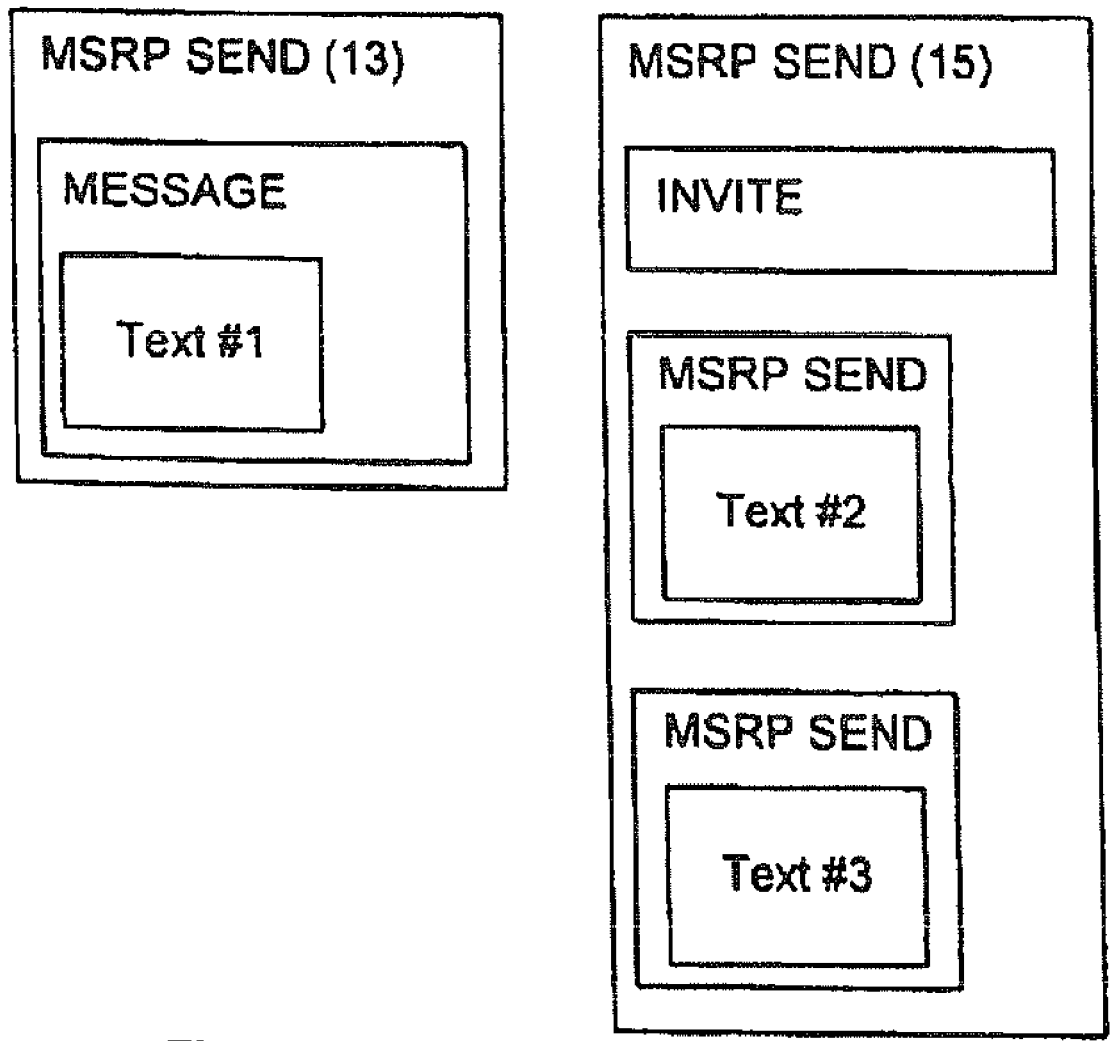
FIG. 2 shows various levels of encapsulation of the different messages, when the user retrieves his unread instant messages from the store message application server.

As illustrated in FIG. 2, for Charlie, every standalone message (e.g., SIP MESSAGE requests) or complete session (e.g., from SIP INVITE until SIP BYE requests, including all the MSRP messages) may be encapsulated in an MSRP SEND message 13, 15. Each MSRP SEND message may contain a content type of message/sip or message/sipfrag. Thus, all the relevant SIP headers may be encapsulated, along with the inner MSRP SEND messages that carry the stored instant messages. This may allow Charlie to determine the origin, time and date, of a message that was left.

The invention, therefore, can include numerous features. For example, one MSRP SEND message can be associated with one stored session of instant messages, including the SIP INVITE and BYE requests and all the MSRP SEND requests containing instant messages. The one MSRP SEND message can be associated with one stored standalone SIP MESSAGE request containing an instant message. The store message AS can insert a date/time header in stored SIP and MSRP messages. The store message AS can keep the existing call-ID/message-ID to allow correlation with RFC 3842.

The present invention also provides general semantics for the encapsulation of stored instant messages, as well as a method and apparatus that enable recipients to gather information about senders, time/date of delivery, separate different sessions, and keep sessions of instant messages together. The present invention also provides for a new use of message/sip and message/sipfrag in MSRP, outside its original context.

It is important to note that certain embodiments of the present invention are also applicable to offline message "push" delivery mechanisms. In push delivery systems, the store messaging application server may know when an offline user gets back online, e.g. either by SIP SUBSCRIBE/NOTIFY and/or any other mechanism. The offline user can get back online, and the stored message application server can immediately establish an MSRP session with the user and deliver the stored messages to the user.

Although the present invention is described in terms of a situation in which the original SIP message is sent to an off-line user, the invention is of broader scope. The invention also includes, for example, the situation in which a SIP message is simultaneously transmitted to a user and stored or archived for later reference.

An embodiment in which the message is archived simultaneously with user reception may be useful for a variety of purposes. For example, a user of a mobile terminal may prefer to store messages separate from the mobile terminal for information security or reliability reasons. Other reasons for simultaneously archiving the stored messages may include the ability to access the stored messages from a plurality of terminals. For example, a user may wish to be able to access stored messages through a wired connection.

A user wishing to obtain a stored message can establish a session with a store message application server. The user can then request stored messages. The store message application server can deliver the stored messages encapsulated in one or more MSRP messages. Thus, the original header information including the identity of the sender, the date and time the message was sent, and the like can be preserved for the user's reference.

Although reference is made to delivery of the message, there is no requirement that the system ensures delivery, or confirms delivery. Thus, the system can, in certain embodiments, transmit the encapsulated message and assume that delivery occurs.

A message in accordance with the present invention is not limited to text messages, but may include, for example, image, audio, video components, or a combination of any of them.

Figure 3:
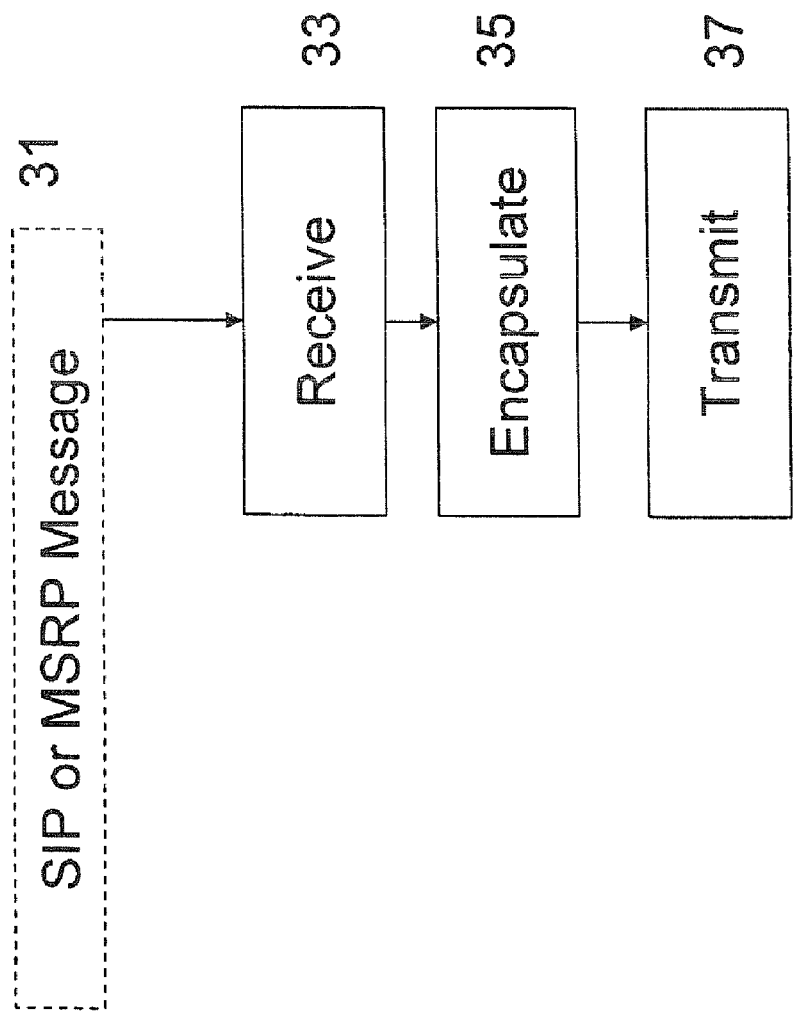
FIG. 3 is a depiction of an example method according to the present invention.

FIG. 3 depicts a method according to certain embodiments of the present invention. As shown in FIG. 3, a SIP or MSRP message 31 can be received in step 33. The message 31 can be a SIP message, either a single SIP message or part of a SIP session, or it can be an MSRP message which is part of a SIP session. The SIP message 31 can contain header information including identity of sender, time sent, date sent, and so forth.

After the SIP or MSRP message 31 is received, it may be encapsulated within an MSRP message in the encapsulate step 35. The encapsulation can be done immediately on receipt, or there may be some delay between receipt and encapsulation. The encapsulation can encapsulate a single SIP message in a single MSRP message or can encapsulate an entire SIP session, including the exchanged MSRP messages in that session, in a single MSRP message.

After the SIP or MSRP message 31 has been encapsulated, it may be transmitted to its intended destination in transmit step 37. The intended destination can be a target user. As used herein, the term "user" can refer to equipment operated by, assigned to, or belonging to the user. Accordingly, the transmission may be to a user's mobile device, such as a personal digital assistant, mobile computer, wireless networked media device, or cell phone. Transmit step 37 may occur immediately after encapsulation, but may be delayed. In certain embodiments, transmission occurs when it is determined that a target user who was previously off-line is now on-line. The target user may request the messages, or the messages may be sent automatically to the user.

Figure 4:
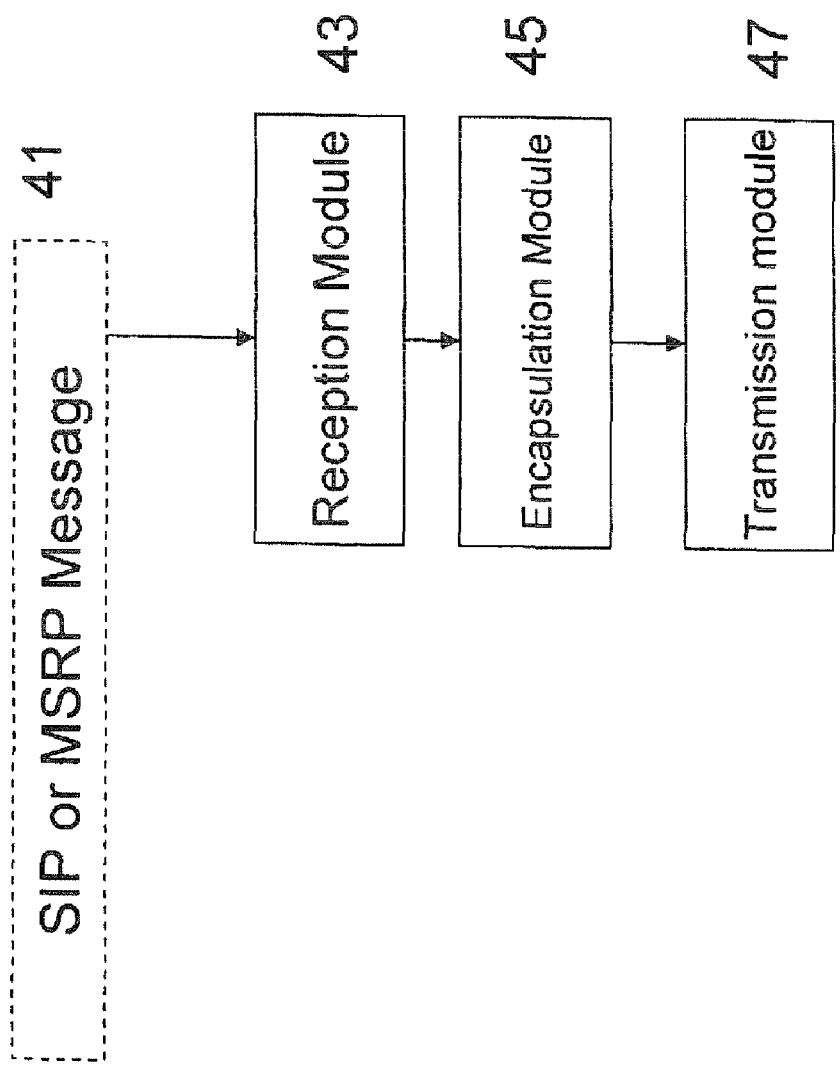
FIG. 4 is a depiction of a sample apparatus according to the present invention.

FIG. 4 depicts an apparatus according to certain embodiments of the present invention. As shown in FIG. 4, a SIP or MSRP message 41 can be received in a reception module 43. The message 41 can be either a single SIP message or part of a SIP session, or it can be an MSRP message which is part of a SIP session. The SIP message 41 can contain header information including identity of sender, time sent, date sent, and so forth.

The reception module can be located in a store message application server. The store message application server may be connected to one or more networks. The store message application server can be equipped with a transceiver for communicating with the one or more networks. The reception module can also include a general purpose computer (not shown) for carrying out storing, notifying, receiving, encapsulating, and transmitting steps. The general purpose computer can include memory. The memory can include RAM and ROM. The memory can be a digital memory embodied on optical or magnetic media. The computer can communicate using a network interface card, or other device for connecting to a network. The general purpose computer may employ any suitable hardware to accomplish the various functions it performs.

After the SIP or MRSP message 41 is received by the reception module 43, it may be encapsulated within an MSRP message in the encapsulation module 45. The encapsulation can be done immediately on receipt, or there may be some delay between receipt and encapsulation. The encapsulation can encapsulate a single SIP message in a single MSRP message or can encapsulate an entire SIP session, including all the SIP and MSRP messages exchanged as part of the session, in a single MSRP message.

After the SIP or MSRP message 41 has been encapsulated, it may be transmitted to its intended destination by the transmission module 47. The intended destination can be a target user. As used herein, the term "user" can refer to equipment operated by, assigned to, or belonging to the user. Accordingly, the transmission may be to a user's mobile device, such as a personal digital assistant, mobile computer, wireless networked media device, or cell phone. The transmission module 47 may transmit immediately after encapsulation occurs, but may delay transmission. In certain embodiments, transmission occurs when it is determined that a target user who was previously off-line is now on-line. The target user may request the messages, or the messages may be sent automatically to the user.

The transmission module 47 may be configured to transmit a notification from notification module (not shown). The notification module can inform a user that stored messages are waiting, and invite the user to retrieve the messages. The notification module can also, or alternatively automatically include a portion of the SIP message in the notification. For example, the notification module may send a notification to a first user that a stored message from a particular second user is waiting. In another embodiment, the notification module may include an indication of the age of the stored message.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method comprising: receiving an instant message generated according to a communications protocol; and generating an encapsulated instant message by encapsulating the received instant message as a payload to a session protocol SEND request,
   determining to transmit the encapsulated instant message to an intended recipient,
   determining to notify the intended recipient that the encapsulated instant message is available, prior to transmitting the encapsulated instant message.

2. A method of claim 1, wherein the communications protocol is Session Initiation Protocol (SIP) or Message Session Relay Protocol (MSRP).

3. A method of claim 1, wherein the session protocol is Message Session Relay Protocol (MSRP).

4. A method of claim 1, wherein the instant message is associated with an off-line user.

5. A method of claim 1, further comprising:
   determining to insert a date/time header to the encapsulated instant message for storage within a message store.

6. A method of claim 1, wherein determining to transmit comprises transmitting the encapsulated instant message to the intended recipient as part of a session initiated by the intended recipient.

7. An apparatus comprising:
   at least one processor; and
   at least one memory including computer program code,
   the at least one memory and the computer program code configured to, with the at least one processor, cause the apparatus to perform at least the following, receive an instant message generated according to a communications protocol; and generate an encapsulated instant message by encapsulating the received instant message as a payload to a session protocol SEND request,
   determining to transmit the encapsulated instant message to an intended recipient, determining to notify the intended recipient that the encapsulated instant message is available, prior to transmitting the encapsulated instant message.

8. An apparatus of claim 7, wherein the communications protocol is Session Initiation Protocol (SIP) or Message Session Relay Protocol (MSRP).

9. An apparatus of claim 7, wherein the session protocol is Message Session Relay Protocol (MSRP).

10. An apparatus of claim 7, wherein the instant message is associated with an off-line user.

11. An apparatus of claim 7, wherein the apparatus is further caused to determine to insert a date/time header to the encapsulated instant message for storage within a message store.

12. An apparatus of claim 7, wherein the determination to transmit comprises transmitting the encapsulated instant message to the intended recipient as part of a session initiated by the intended recipient.

13. A non-transitory computer-readable storage medium carrying one or more sequences of one or more instructions which, when executed by one or more processors, cause an apparatus to at least perform the following steps:
   receiving an instant message generated according to a communications protocol; and
   generating an encapsulated instant message by encapsulating the received instant message as a payload to a session protocol SEND request,
   determining to transmit the encapsulated instant message to an intended recipient,
   determining to notify the intended recipient that the encapsulated instant message is available, prior to transmitting the encapsulated instant message.

14. A non-transitory computer-readable storage medium of claim 13, wherein the communications protocol is Session Initiation Protocol (SIP) or Message Session Relay Protocol (MSRP).

15. A non-transitory computer-readable storage medium of claim 13, wherein the session protocol is Message Session Relay Protocol (MSRP).

16. A non-transitory computer-readable storage medium of claim 13, wherein the apparatus is further caused to perform: determining to insert a date/time header to the encapsulated instant message for storage within a message store.

* * * * *